United States Patent
Keronen et al.

(10) Patent No.: US 8,432,714 B2
(45) Date of Patent: Apr. 30, 2013

(54) LOAD BALANCING OF PARALLEL CONNECTED INVERTER MODULES

(75) Inventors: Jorma Keronen, Espoo (FI); Reijo Virtanen, Vantaa (FI); Simo Pöyhönen, Helsinki (FI)

(73) Assignee: ABB Oy, Helsinki (FI)

( * ) Notice: Subject to any disclaimer, the term of this patent is extended or adjusted under 35 U.S.C. 154(b) by 313 days.

(21) Appl. No.: 12/694,861

(22) Filed: Jan. 27, 2010

(65) Prior Publication Data

US 2010/0188135 A1 Jul. 29, 2010

(30) Foreign Application Priority Data

Jan. 27, 2009 (EP) .................................... 09151388

(51) Int. Cl.
*H02M 7/48* (2007.01)
(52) U.S. Cl.
USPC .............................................................. 363/71
(58) Field of Classification Search .............. 363/71, 363/73, 97, 95, 123, 131
See application file for complete search history.

(56) References Cited

U.S. PATENT DOCUMENTS

| | | | |
|---|---|---|---|
| 5,253,155 A | 10/1993 | Yamamoto | |
| 5,905,645 A * | 5/1999 | Cross | 363/65 |
| 7,646,112 B2 * | 1/2010 | Devine | 307/53 |
| 2001/0026461 A1 * | 10/2001 | Jensen | 363/71 |
| 2005/0047182 A1 | 3/2005 | Kraus et al. | 363/71 |
| 2006/0013025 A1 * | 1/2006 | Poyhonen et al. | 363/55 |
| 2006/0038598 A1 * | 2/2006 | Reilly et al. | 327/261 |
| 2008/0043501 A1 * | 2/2008 | Tan et al. | 363/71 |
| 2009/0313313 A1 * | 12/2009 | Yokokawa et al. | 708/300 |

FOREIGN PATENT DOCUMENTS

| | | |
|---|---|---|
| DE | 103 54 130 A1 | 6/2005 |
| EP | 0 524 398 A2 | 1/1993 |
| EP | 1 427 094 A2 | 6/2004 |
| WO | WO 2004/107550 A1 | 12/2004 |

OTHER PUBLICATIONS

European Search Report of Application No. 09151388.7 dated May 11, 2009.

\* cited by examiner

*Primary Examiner* — Adolf Berhane
*Assistant Examiner* — Jeffrey Gblende
(74) *Attorney, Agent, or Firm* — Buchanan Ingersoll & Rooney PC

(57) ABSTRACT

A method and an arrangement are disclosed for balancing load between parallel connected inverter modules, which inverter modules are arranged to supply a common load. The method can include providing similar switching instructions for parallel connected inverter modules, determining on the basis of phase currents of each parallel inverter module a first time period for each output phase of each inverter module for correcting current imbalance by advancing or delaying turn-on or turn-off time instants of switch components of the inverter modules, and advancing or delaying the turn-on or turn-off time instants of the switching instructions based on the first time period. The method also can include determining temperatures of each output phase of each inverter module, modifying the switching instructions for one or more of the parallel inverter modules for controlling the temperatures of the output phases, and controlling the inverter modules with a switching instruction in which the turn-on or turn-off times have been advanced or delayed in respect of one or more parallel modules and further modified in respect of one or more inverter modules.

5 Claims, 3 Drawing Sheets

LOAD BALANCING OF PARALLEL CONNECTED INVERTER MODULES

RELATED APPLICATION

This application claims priority under 35 U.S.C. §119 to European Patent Application No. 09151388.7 filed in Europe on Jan. 27, 2009, the entire content of which is hereby incorporated by reference in its entirety.

FIELD

Local balancing inverter modules, for sharing an output current between two or more parallel connected inverter, is disclosed herein, such as modules feeding a common load.

BACKGROUND INFORMATION

An inverter is an apparatus that is used for producing an alternating voltage with a variable frequency from a direct voltage source. Inverters can operate by switching either a positive or a negative voltage from the DC voltage source to the load. Output switches of the inverter can be modulated according to a control method for producing a desired voltage to the load. A known application of an inverter is in a frequency converter. Frequency converters, in turn, can be used for driving a motor in a controllable fashion.

In some situations, high-powered inverters are produced from parallel connected inverter units. Inverters that are connected in parallel can feed the same load and receive the same instructions for the output switches. Outputs of the parallel connected inverters can be equipped with output reactors and the corresponding phases of parallel inverter units are connected together after the reactors and a single cable or multiple cables per phase are connected to the load. Alternatively, each inverter unit can be connected with its own cabling to the load, and the outputs can be connected in parallel first in the terminals of the load.

Although the parallel operated inverter units can receive simultaneous and similar control signals, the parallel units do not behave similarly. Due to parameter differences of switch components and differing impedances in parallel branches, the currents between the units can be unequal in magnitude. Such a current imbalance can stress the components unevenly and wear switch components with higher current prematurely. A higher current in a switch component can result in a higher dissipated power and, further, a higher temperature of the component.

Current imbalance has been addressed by modifying switch control pulses in order to balance the currents. The control pulses can be modified by delaying a turn-on time instant for a switch that has the highest current or by delaying turn-off time instants for a switch that has the smallest current. One such method is disclosed in EP 0 524 398. In these solutions, the conducting times of the parallel components are modified to equalize stresses to the switch components on the basis of measured inverter unit currents.

The parallel operated switch components can still be unevenly worn even if the currents have been balanced. For example, cooling of the switch components may differ from each other for some reason. The reasons for different coolings include an uneven flow of cooling air in a cabinet, deterioration of the cooling of some inverter modules due to impurities in the cooling air, weak thermal connections between heat sinks and the switch components, and so forth.

The modification of the control pulses for balancing the currents on the basis of current measurement may thus lead to a situation in which the switch component is damaged due to an excessive temperature.

SUMMARY

A method is disclosed of balancing load between parallel connected inverter modules arranged to supply a common load, the method comprising providing switching instructions for the parallel connected inverter modules, determining, based on the phase currents of each parallel inverter module, a first time period for each output phase of each inverter module for correcting current imbalance by advancing or delaying turn-on or turn-off time instants of switch components of the inverter modules, advancing or delaying the turn-on or turn-off time instants of the switching instructions based on the first time period, determining temperatures of each output phase of each inverter module, modifying the switching instructions for at least one of the parallel inverter modules for controlling the temperatures, and controlling the inverter modules with the modified switching instructions.

An arrangement is also disclosed for balancing load between parallel connected inverter modules arranged to supply a common load, the arrangement comprising means for providing switching instructions for parallel connected inverter modules, means for determining, based on phase currents of each parallel inverter module, a first time period for each output phase of each inverter module for correcting current imbalance by advancing or delaying turn-on or turn-off time instants of switch components of the inverter modules, means for advancing or delaying the turn-on or turn-off time instants of the switching instructions based on the first time period, means for determining temperatures of each output phase of each parallel inverter module, means for modifying the switching instructions for at least one of the parallel inverter modules for controlling the temperatures, and means for controlling the inverter modules with the modified switching instructions.

BRIEF DESCRIPTION OF THE DRAWINGS

In the following, other objects and advantages will be described in greater detail by reference to exemplary embodiments and the attached drawings, in which.

DETAILED DESCRIPTION

Exemplary embodiments as discussed herein are based on the idea of balancing the loading between parallel inverter modules by modifying the turn-on or turn-off pulses on the basis of current imbalance and temperature differences between the modules. As disclosed herein, the currents between the inverter modules need not be driven to same value if the temperatures of the modules differ from each other.

According to exemplary embodiments, current imbalance can be kept within a certain limit and the temperatures of the different output modules can also be kept in control. The fact that the currents are not completely balanced is of less importance since the current imbalance, if not taken into account, may lead to premature wear or sudden destruction of the components due to heating up of the components. When the temperatures of the components are taken into account in current balancing, the parallel currents do not have to be equal in magnitude.

Figure 1:
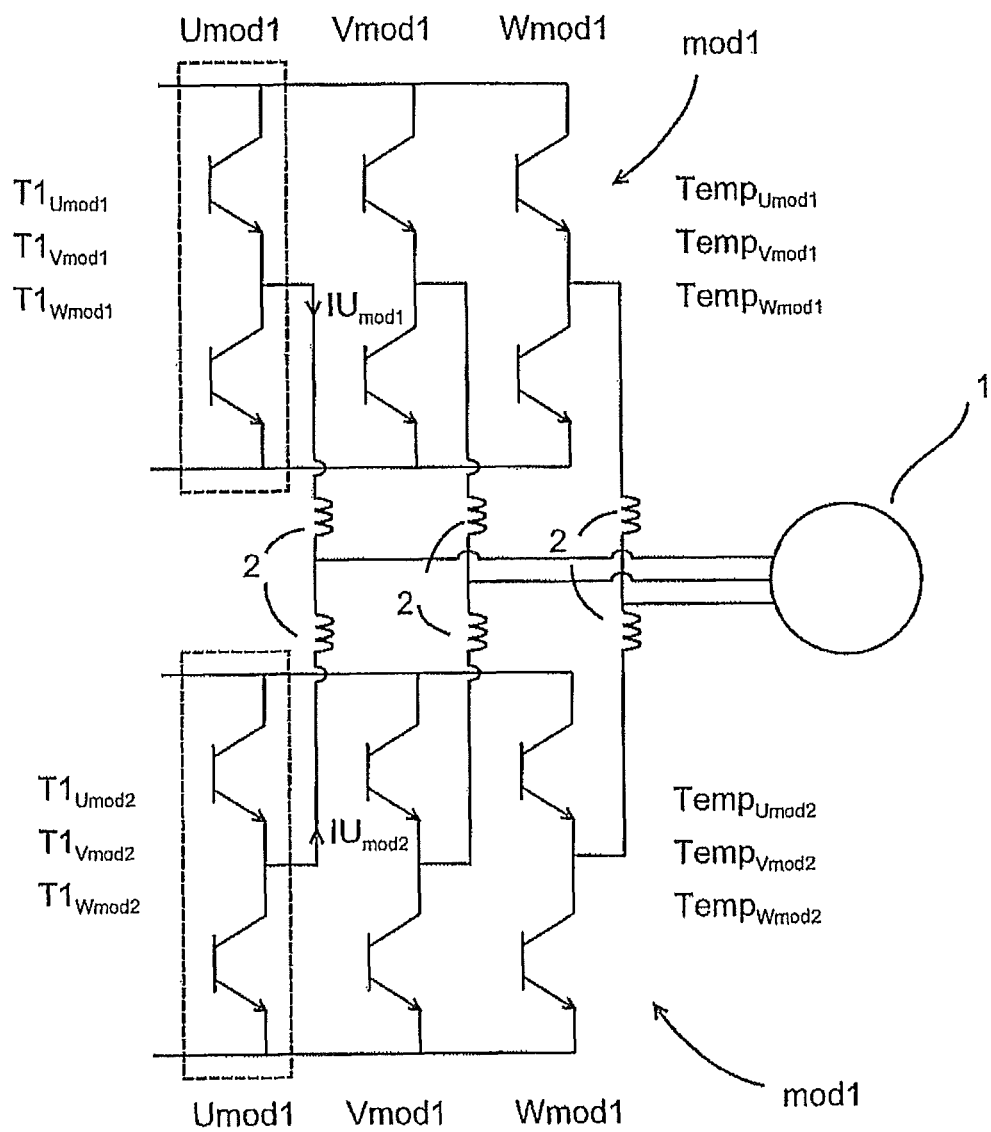
FIG. 1 illustrates an exemplary parallel connection of two inverter modules.

FIG. 1 shows two parallel connected inverter modules mod1, mod2 feeding a common load 1. Phase outputs of the modules are equipped with chokes 2. FIG. 1 shows how the parallel modules have output switches that belong to a same phase U (Umod1, Umod2), V (Vmod1, Vmod2), W (Wmod1, Wmod2).

Phase currents (e.g., the combined currents to the load), are formed of output currents of the parallel modules. As explained above, the currents are not necessarily divided equally between the parallel modules. If a current is higher in one parallel module, it is known to balance the currents by delaying the turn-on instant for a phase and module that has the highest current. In general, the balancing of the currents is carried out by shortening the conducting time of the phase and module that has the highest current. This shortening can be carried out also by advancing the turn-off of the switch or by delaying the turn-off instant of other modules.

According to exemplary embodiments, a first time period is determined from the phase currents of each parallel module. The first time period is thus determined for each phase of each parallel module, and the determined first time period is the amount by which the conducting period of the phase and module is diminished. With reference to FIG. 1, first time periods $T1_{Umod1}$, $T1_{Umod2}$, $T1_{Vmod1}$, $T1_{Vmod2}$, $T1_{Wmod1}$, $T1_{Wmod2}$ are determined. In these reference numerals, T1 refers to first time period, U, V and W refer to phase, and mod1 and mod2 refer to parallel inverter modules.

The time periods can be determined for example by measuring phase currents $I_{Umod1}$, $I_{Umod2}$, $I_{Vmod1}$, $I_{Vmod2}$, $I_{Wmod1}$, $I_{Wmod2}$ of each module and calculating average phase currents from the measured currents. In the example of FIG. 1 where the number of parallel modules is 2, the average current for phase U is calculated as $I_{Uave}=(I_{Umod1}+I_{Umod2})/2$. Output currents of the modules are compared with the calculated average by taking ratios $I_{Umod1}/I_{Uave}$ and $I_{Umod2}/I_{Uave}$. Thus, each output current of the modules can be compared with the average current of the phase.

Once the ratios have been calculated as indicated above, each ratio (six ratios in the case of two parallel modules with three phases) is fed to a control circuit, which integrates the ratios and produces control values which are used as the first time periods for delaying the turn-on time instants. The value of the time periods is limited to zero and to a predetermined upper limit. Some of the first time periods obtain a zero value since the phase currents of some modules are inevitably below the calculated average.

Figure 2:
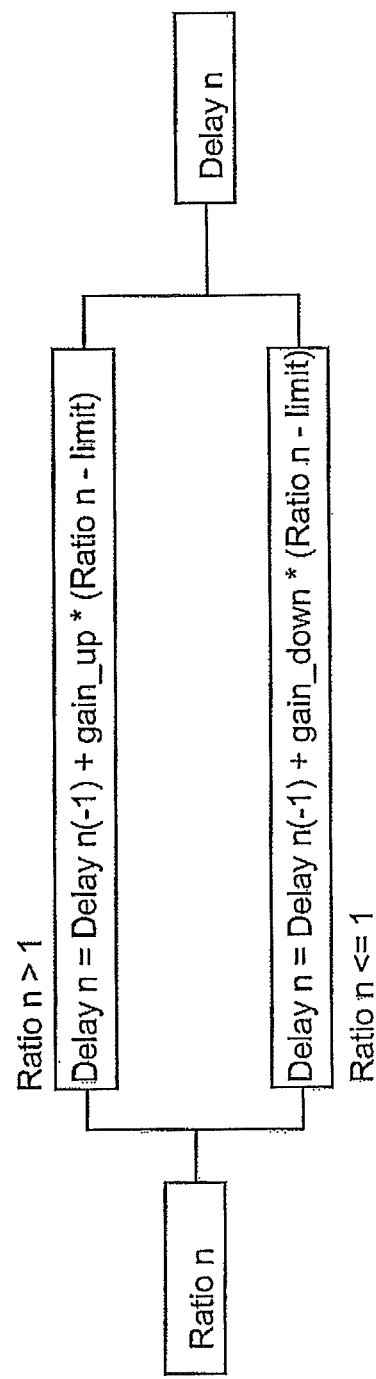
FIG. 2 is an example of calculating delays for turn-on time instants.

In calculating the first time periods, a limit value may be subtracted from the ratios obtained. The limit value defines a limit above which the currents are controlled. Further, the result of the subtraction is multiplied by a gain factor. The formation of the first time period used for delaying the turn-on instants is illustrated in FIG. 2 as a block diagram. An input to the system is the calculated ratio in block 21. If the ratio is greater than one (e.g., the phase current in question is higher than the average of the phase currents), the first time period is calculated as indicated in block 22, which takes into account the previous value of the first time period (i.e. the delay), and adds to this previous value the new value calculated using the ratio.

If the ratio is equal to or smaller than one, the first time period is made smaller (block 23). Block 23 and block 22 have different gains (gain_up, gain_down). It has been found out that by using different values for gain, the output of the calculation is more stable and does not tend to oscillate. The output from the system is the first time period. As mentioned above, the first time period is limited to a predefined higher limit and to zero.

Since at smaller currents the current balance may not be so important, the first time period may be set to zero at low values of current, for example when the current is 30% or lower than the nominal current of the module.

In the above example, the first time period is determined by integrating the ratios of the currents. The first time period for each phase and module may also be determined by integrating the differences between each partial phase current and the average current of that phase. The use of integration is presented as an example in the above, and the same results can also be obtained by using P-, PI- or PID-control or some other suitable mechanism. The above example for determining the first time period is given as one possibility for obtaining the desired value. It will be apparent to those skilled in the art that the first time period can also be calculated in some other suitable way.

According to exemplary embodiments, the method includes determining temperatures $Temp_{Umod1}$, $Temp_{Umod2}$, $Temp_{Vmod1}$, $Temp_{Vmod2}$, $Temp_{Wmod1}$, $Temp_{Wmod2}$ of each output phase of each inverter module. The temperatures may be measured values or ones that are estimated using temperature models.

Once the temperatures have been determined, the switching instructions for one or more of the parallel inverter modules can be modified for controlling the temperatures of the output phases. Thus the switching instructions, which are obtained from a control circuitry, can be modified according to the determined temperatures. The temperatures may be compared with the average phase temperature as in connection with the currents. Thus, an average temperature for each phase can be calculated as:

$$Temp_{Uave}=(Temp_{Umod1}+Temp_{Umod2})/2.$$

After the average temperature has been calculated, then a ratio between each phase temperature and the average of the same phase can be calculated. Ratios are calculated for each phase. If the temperature of a module is higher than the average temperature, the temperature of that module and phase is decreased by modifying the switching instruction. This can be carried out using a controller that integrates the difference and modifies the switching instruction to minimize the temperature difference.

According to an exemplary method, the inverter modules can be controlled with the switching instructions in which the turn-on or turn-off times have been advanced or delayed in respect of one or more parallel modules and further modified in respect of one or more inverter modules. The switching instructions that are provided to parallel inverter modules can be generated in a normal manner in a modulator that calculates according to a selected scheme time instants at which the output switches are operated.

The modification to the switching instructions based on the temperatures can be carried out in multiple ways. According to an exemplary embodiment, the switching instructions for one module are regenerated to produce a decreased current. Thus, the switching instruction common to all parallel modules is divided between the modules, and the modules receive a separate switching instruction, which has been generated from the original instruction.

In another exemplary embodiment, a second time period is generated based on the temperatures for each module and phase. These second time periods are added to the respective first time periods, and the turn-on or turn-off time instants are delayed or advanced according to the sum of the periods. The calculation of the second time periods may be carried out in the same way as the calculation of the first time periods. The temperature control may be implemented in a control loop operating at a slower time level than the current control loop.

The operation of the temperature control is, for example, enabled when the temperature difference and/or the calculated ratio exceeds a set limit. The temperature difference may grow due to differences in the cooling of the modules and when this happens, the control tries to lower the current of the phase and module having the highest temperature. This, in turn, increases current in the other modules. When the current in the other modules grow, current controllers try to limit these currents. Thus, a temperature controller limits the temperature by decreasing the current and the current controllers, in turn limit, the current in the other phases. This leads to a situation where the controllers act against each other.

In an exemplary embodiment, the temperature control affects the output of the current control by limiting the maximum value of the current control. According to the above embodiment, the duration of the first time period is limited in accordance with the output of the temperature control. This output of the temperature controller is the second time period. Thus, when the temperature controller controls the temperatures by changing the turn-on or turn-off delays, it also sets an upper limit for the outputs of current controllers belonging to the same phase. This way the temperature controller gets a higher priority over the current controller.

In addition to modifying the switching instructions, the temperature controller can also limit the maximum value of the first time period (e.g., the outputs of the current controllers belonging to the same phase). This procedure is further explained in the following with reference to FIG. 3.

Figure 3:
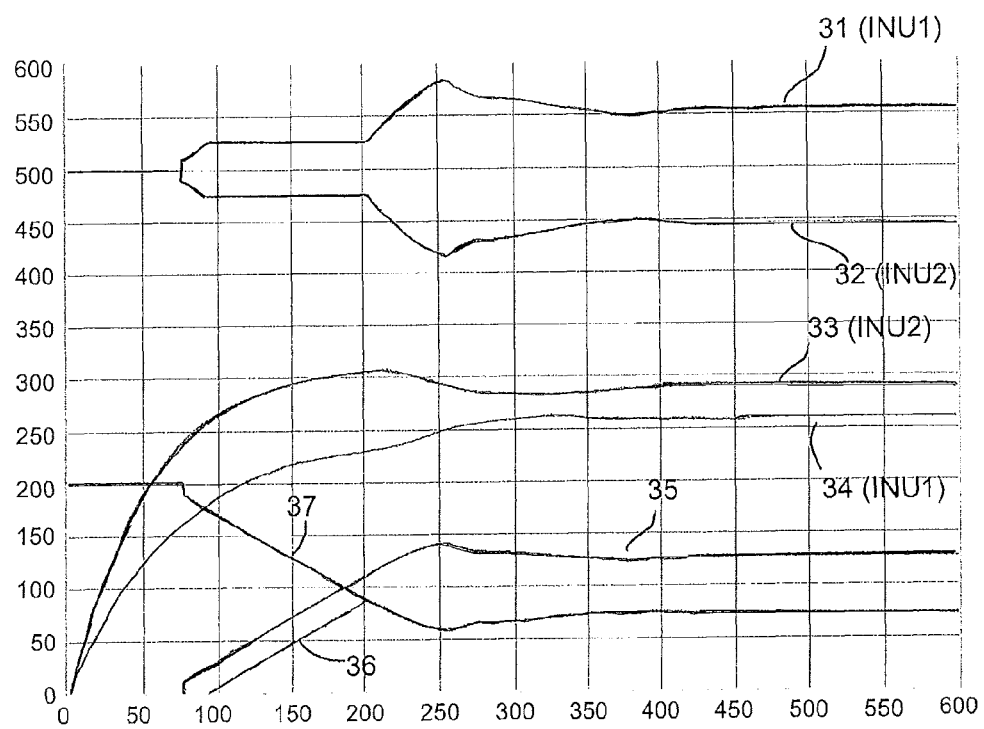
FIGS. 3 and 4 show exemplary simulated curves relating to the operation disclosed herein.

FIG. 3 shows exemplary simulation results of a system in which two inverter modules are connected in parallel. The inverter modules are provided with different thermal resistances and modules provide DC-current to a load. For the sake of simplicity, the simulation is carried out using DC-current while in an actual case the current is AC-current.

In the beginning of the procedure, currents 31, 32 are even (500 A), and temperatures 33, 34 of modules begin to rise. As seen in FIG. 3, the temperature 33 of inverter unit 2 (INU2) rises faster than the temperature 34 of the other module (INU1) due to higher thermal resistance.

At time instant 75$s$, the temperature difference rises over a set limit, and the switching instructions for inverter unit INU2 are modified. This modifying of the switching instructions is thus carried out by the temperature controller by delaying the turn-on time instants, for example. The output of the temperature controller is shown in FIG. 3 with reference numeral 35. As the switching instructions are modified for INU2, the current 31 (INU1) starts to grow and current 32 (INU2) starts to decrease. The abrupt changes in the currents 31, 32 and in the output of the temperature controller 35 is due to the P part of the PI controller.

At time instant 94$s$ the current 31 (INU1) has grown to a limit at which the current controller starts to control the current by delaying the turn-on time instants. The output of the current controller is shown as line 36. Simultaneously, the temperature controller modifies further the switching instructions in order to lower the current 32 (INU 2) and, as a result of the two controllers operating against each other, the currents are stabilized so that the difference between the currents stays the same. As seen in FIG. 3, the difference between the currents stays the same between time instants 94$s$ and 203$s$. During this interval the outputs of the controllers rise at the same rate and the difference between the outputs of the controllers is constant.

As mentioned above, the output of the current controller is limited as the output of the temperature controller rises. The maximum value for the output of the current controller is shown as line 37. At time instant 203 the current controller rises to the maximum value limited by the line 37. After this time instant the temperature controller dominates the operation and the currents begin to deviate and the temperature curves 33, 34 begin to converge on each other.

Although the currents are not balanced, the temperatures are controlled such that the highest temperature is within a certain limit from the average of the temperatures. As the temperature is controlled, the outputs of the current controllers are limited. Thus, the lesser the temperature needs to be controlled, the more balanced the currents can be controlled.

The current balance can be desirable for obtaining similar temperatures in the components, but as the temperatures are controlled together with the currents, the situation is more optimal than if the currents were completely balanced. It should also be noted that in the example of FIG. 3, the load is balanced in such a way that the module having the higher current is also the cooler one of the modules.

Figure 4:
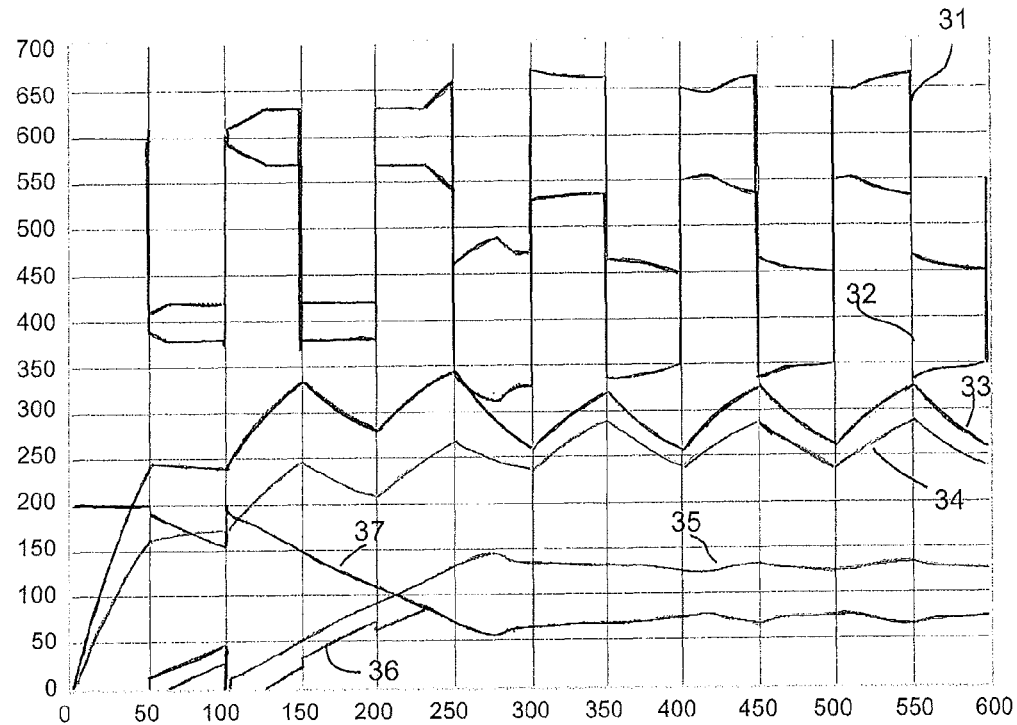

FIG. 4 shows other exemplary simulation results in which the reference numerals are as in FIG. 3. In the example of FIG. 4, the load is cyclic having 50 seconds of 1200 A and 50 seconds of 800 A. These results also show how the temperature controller and the current controller co-operate in the above-described manner.

In the above examples, the temperatures of the modules change to an extent that the switching instructions are modified for controlling the temperatures. The conduction period is shortened for the module in which the phase temperature is higher. This leads to a situation where the current of the warmer module is reduced and the current of the cooler increases. When the current controllers begin to react on the current imbalance, the controllers determine the first time period and shorten the conducting period of the module having the higher phase current accordingly. The operation of the load balancing is similar when the currents deviate, first leading to temperature imbalance. The above examples are simple structures having two modules in parallel. The disclosure is, however, suitable to be used in connection with an unlimited number of parallel modules.

Exemplary embodiments are suitable to be used in connection with, for example, liquid cooled systems. In such liquid cooled systems the cooling obtained for different modules is basically the same. In the load balancing, when used in connection with liquid cooled systems, the balancing is mainly carried out based on phase currents.

Those skilled in the art will appreciate that exemplary embodiments can be implemented in various ways. The disclosure and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of balancing load between parallel connected inverter modules arranged to supply a common load, the method comprising:
- providing switching instructions for the parallel connected inverter modules;
- determining, based on the phase currents of each parallel inverter module, a first time period for each output phase of each inverter module for correcting current imbalance by advancing or delaying turn-on or turn-off time instants of switch components of the inverter modules;
- advancing or delaying the turn-on or turn-off time instants of the switching instructions based on the first time period;
- determining temperatures of each output phase of each inverter module;
- modifying the switching instructions for at least one of the parallel inverter modules for correcting a temperature imbalance between parallel inverter modules by comparing the temperatures of corresponding output phases of each parallel inverter module with one another, determining, for each output phase of each inverter module, a second time period for correcting a temperature imbalance between output phases of each inverter module based on the comparing, and advancing or delaying the turn-on or turn-off time instant based on a sum of the first time period and the second time period while continuing to operate the inverter modules; and
- controlling the inverter modules with the modified switching instructions while continuing to operate the parallel inverter modules;
- wherein the first time period has a predetermined maximum value common to each output phase, the method further comprising limiting a maximum value of the first time period based on a value of the second time period.

2. A method according to claim 1, wherein the comparing of the temperatures of the corresponding output phases comprises:
- calculating an average of the temperatures of switches of each phase, the switches of a phase being situated in parallel modules; and
- calculating a ratio of the temperature of each switch to the average temperature of the phase in which the switch belongs.

3. A method according to claim 1, comprising:
- determining the first time period using a controller, the controller outputting a value used as the first time period when controlling current imbalance.

4. A method according to claim 1, comprising:
- determining the second time period using a controller, the controller outputting a value used as the first time period when controlling the current imbalance.

5. An arrangement for balancing load between parallel connected inverter modules arranged to supply a common load, the arrangement comprising:
- means for providing switching instructions for parallel connected inverter modules;
- means for determining, based on phase currents of each parallel inverter module, a first time period for each output phase of each inverter module for correcting current imbalance by advancing or delaying turn-on or turn-off time instants of switch components of the inverter modules;
- means for advancing or delaying the turn-on or turn-off time instants of the switching instructions based on the first time period;
- means for determining temperatures of each output phase of each parallel inverter module;
- means for modifying the switching instructions for at least one of the parallel inverter modules for correcting a temperature imbalance between parallel inverter modules by comparing the temperatures of corresponding output phases of each parallel inverter module with one another, determining, for each output phase of each inverter module, a second time period for correcting a temperature imbalance between output phases of each inverter module based on the comparing, and advancing or delaying the turn-on or turn-off time instant based on a sum of the first time period and the second time period while continuing to operate the inverter modules; and
- means for controlling the inverter modules with the modified switching instructions while continuing to operate the inverter modules;
- wherein the first time period has a predetermined maximum value common to each output phase, and the maximum value of the first time period is limited based on a value of the second time period.

* * * * *